A. J. MORSE.
TRANSMISSION GEARING.
APPLICATION FILED DEC. 28, 1907.
982,978.
Patented Jan. 31, 1911.
3 SHEETS—SHEET 2.
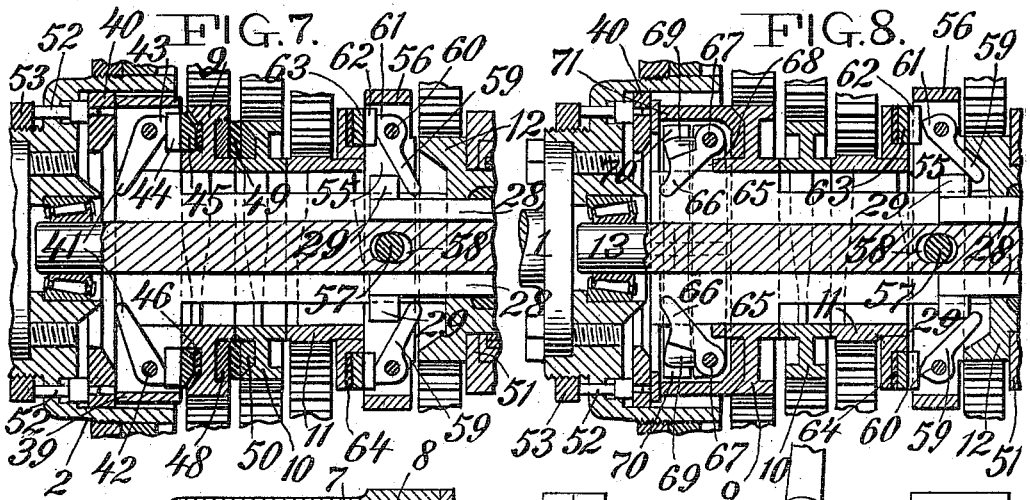
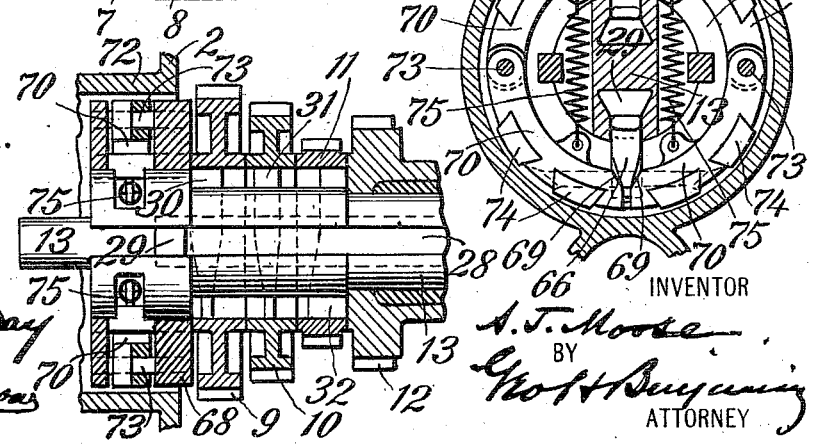

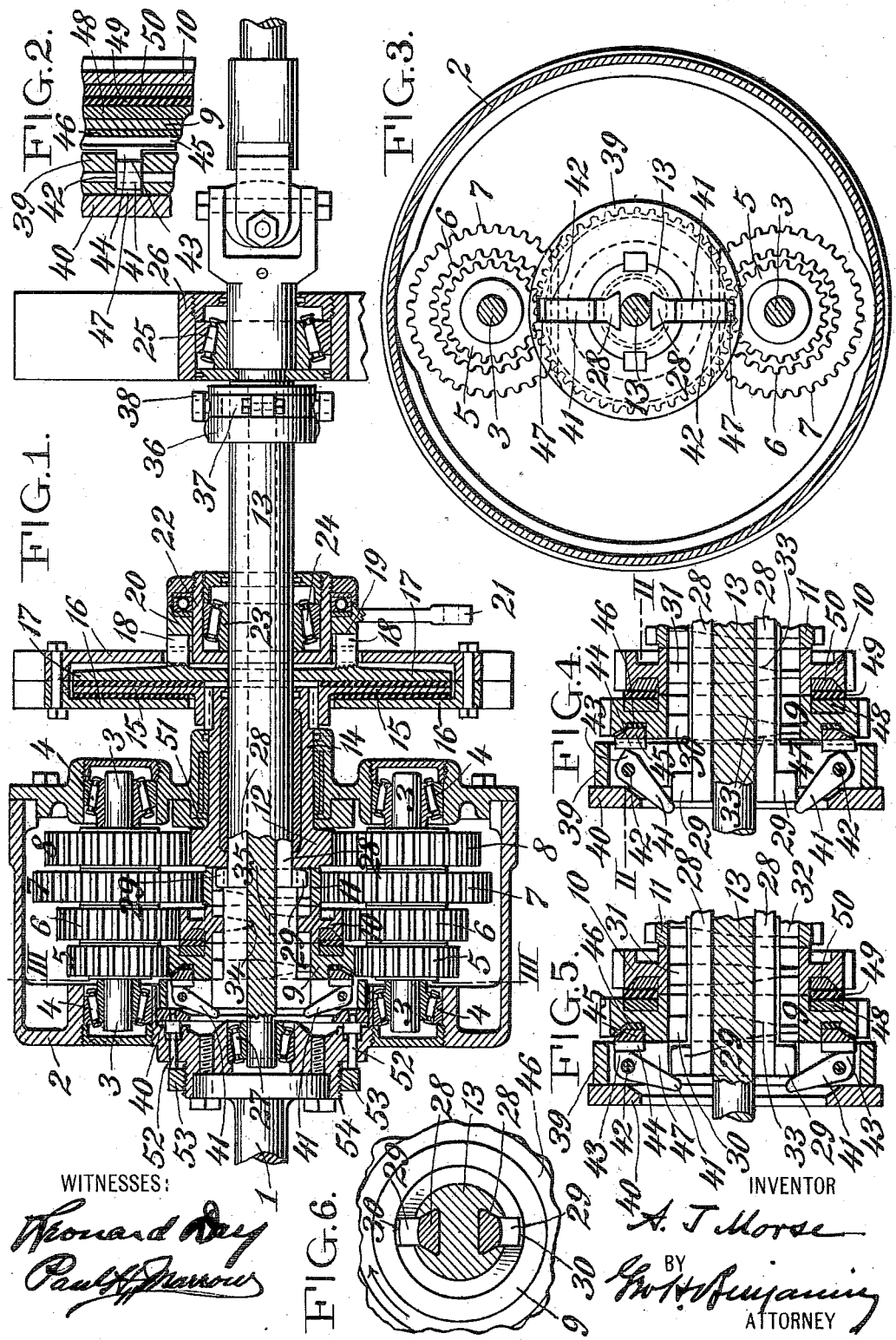

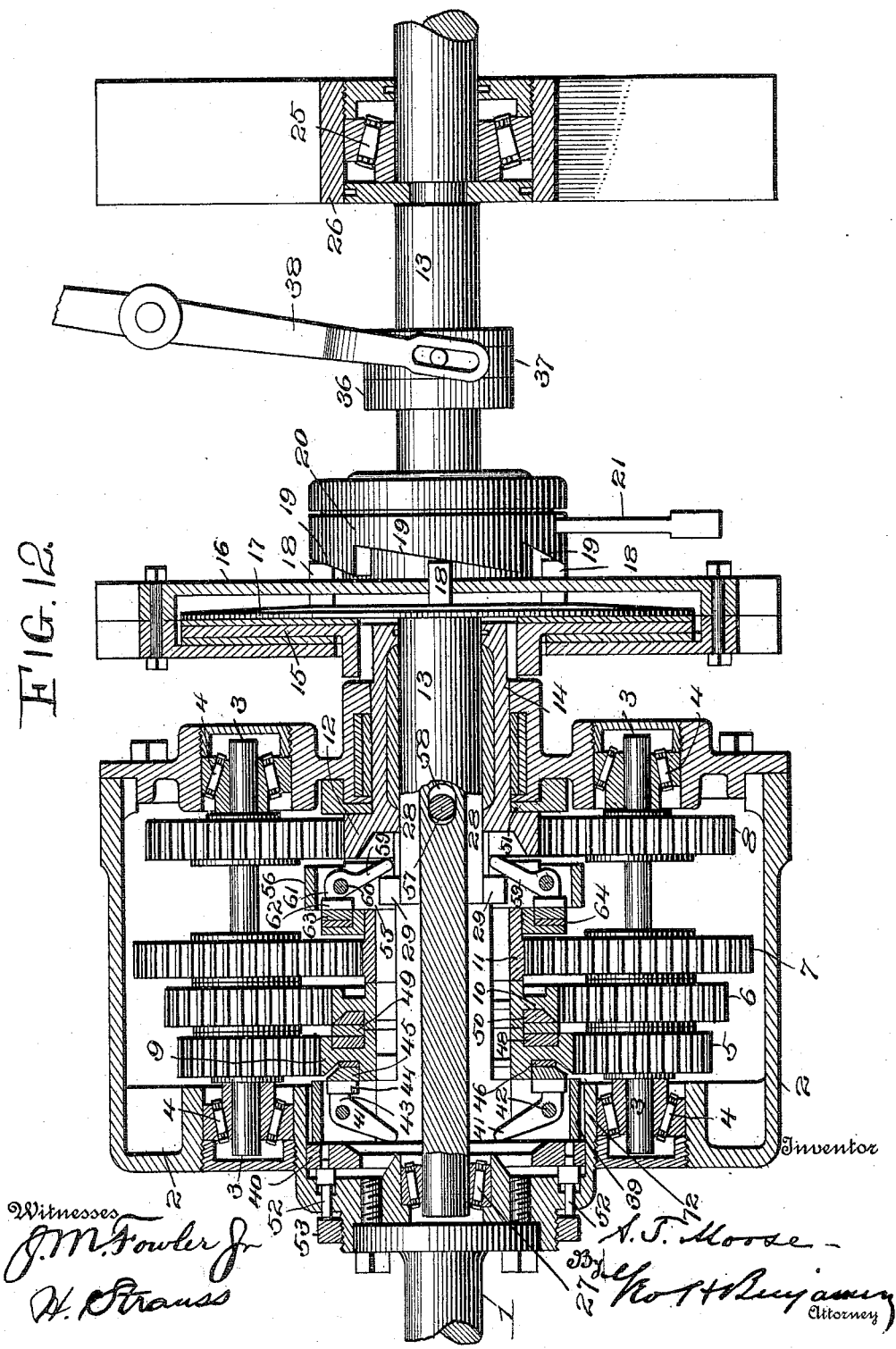

UNITED STATES PATENT OFFICE.

ARTHUR JACOB MORSE, OF TORRINGTON, CONNECTICUT, ASSIGNOR TO CONNECTICUT MOTOR VEHICLE COMPANY, OF NEW YORK, N. Y., A CORPORATION OF NEW YORK.

TRANSMISSION-GEARING.

982,978.  Specification of Letters Patent.  Patented Jan. 31, 1911.

Application filed December 28, 1907. Serial No. 408,381.

*To all whom it may concern:*

Be it known that I, ARTHUR JACOB MORSE, a citizen of the United States, residing at Torrington, county of Litchfield, State of Connecticut, have invented certain new and useful Improvements in Transmission-Gearing, of which the following is a specification.

This invention relates to transmission gearing, such as employed to connect driving and driven shafts to rotate the latter at different speeds and in the same or in a reverse direction relative to the driving shaft.

The present invention relates to further improvements in the means for applying the general principles involved in the transmission gearing shown and described in my earlier application for patent filed June 6, 1907, Serial No. 377,596, in which provision is made for rotating the driving and driven shafts either independently or in coupled relation, in the same direction or in opposite directions, at the same speed or at different speeds as desired. The driven shaft is coupled direct with the driving shaft for the highest speed, and for any lower speed of transmission the reducing gears are interposed.

The present invention consists of means whereby the devices used to connect the driven shaft to different gears to effect changes in speed of the driven shaft, are also used to actuate a friction clutch for connecting the driven shaft to the driving shaft, whereby the clutch for direct drive can be made gradual, thus avoiding shock.

Reference is made to the accompanying drawing, in which—

Figure 1 is a longitudinal section, showing key operated means within the fly wheel for clutching the driven shaft to the driving shaft. Fig. 2 is a section on the line II—II of Fig. 4, showing a portion of the friction clutch. Fig. 3 is a cross section approximately on the line III—III of Fig. 1. Fig. 4 is an enlarged longitudinal section, showing a part fixed to the driven shaft clutched between the fly wheel and gear wheels rotated by it. Fig. 5 is a view similar to Fig. 4 showing the part fixed to the driven shaft disconnected from the fly wheel and from the gear wheels rotated by it. Fig. 6 is a cross section of the driven shaft, showing a portion of one of the speed changing gear wheels. Fig. 7 is a longitudinal section showing a modification, in which the device used to clutch the driven shaft to the driving shaft comprises a friction clutch, indirectly clutching the driven shaft to the driving shaft at the end of movement of said device in each direction. Fig. 8 is a longitudinal section, showing a modification in which the device used to clutch the driven shaft indirectly to the driving shaft at the end of movement of said device in one direction, is used to actuate a friction clutch at the end of movement in the opposite direction, serving to clutch the driven shaft to a gear wheel causing rapid rotation of the driven shaft. Fig. 9 is a longitudinal section, showing a modification in which the device used to clutch the driven shaft to speed changing gear wheels rotated by the fly wheel, is used to actuate a friction clutch directly clutching the driven shaft to the fly wheel. Fig. 10 is a cross section on the line X—X of Fig. 9. Fig. 11 is a sectional plan view on the line XI—XI of Fig. 9. Fig. 12 is a longitudinal section of the coupling device with the arrangement clutch mechanism shown in Fig. 7.

Similar numerals refer to corresponding parts in all the views.

To the driving shaft 1 is secured a fly wheel 2, having counter shafts 3 mounted in bearings 4 on opposite sides of its axis of rotation. To each of the counter shafts 3 are rigidly secured gear wheels 5, 6, 7, and 8, of varying diameter, which are permanently in mesh with the gears 9, 10, 11, and 12, of varying diameter, respectively, loosely mounted on the driven shaft 13. These gear wheels constitute reducing gears which may be connected in different relations to transmit power at different speeds, as hereinafter described.

The gear wheel 12 is provided with a hub extension which forms a bearing 14 for the fly wheel 2. To the outer end of said hub extension is secured a friction disk 15, adapted for engagement on one face with a friction surface on the fixed stationary casing 16, and on the opposite face with a movable but non-rotatable friction disk 17. The movable disk 17 is provided with studs 18, projecting through holes in the stationary casing 16, and coöperating with said studs are a series of cam surfaces 19 on an oscillating collar 20, the movement of which is controlled by arm 21.

Oscillating collar 20 has a bearing upon the outer face of a sleeve 22, forming part of stationary casing 16. To the driven shaft 13 is secured a collar 23, which has a bearing 24 on the inner side of sleeve 22. Driven shaft 13 also has a bearing 25 upon a stationary frame 26, and a bearing 27 is provided for one end of shaft 13, at the center of fly wheel 2, near the end of driving shaft 1.

Sliding in dove-tail grooves in the driven shaft 13 are two clutch rods 28, each provided with a key 29. In order to provide for varying speeds of the driven shaft, the gears 9, 10, and 11 carried by the shaft are provided respectively with slots 30, 31, and 32, into which the keys 29 may be moved to lock the gear wheels with the driven shaft 13. Between the several gear wheels, there are annular channels into which the keys 29 may be moved for the purpose of disengaging the gears from the driven shaft. In order that the keys 29 may readily enter the slots in the gear wheels, said parts are cut away on one side to form inclines, as shown at 33, which serve to guide the keys into the slots. If, as shown in Figs. 5 and 6, the gear wheel 5 is rotating in the direction of the arrow, the face 34, adjacent to the incline, is cut away, while the opposite face 35, against which the keys strike, is made the full length of the slot. Evidently the incline 33 and the faces 34 and 35 can be formed to provide for movement of keys 29 in either direction, and the incline 33 and faces 34 and 35 can also be formed in a reverse direction, to provide for proper engagement of the slots 32 of reversing gear wheel 11 with the keys 29 of clutch rods 28.

To provide for longitudinal movement of the clutch rods 28 in the grooves in driven shaft 13, a sliding collar 36, secured to rods 28, is provided with an annular groove in which rides a ring 37, having pins which engage slots in a pivoted lever 38.

The operation of the mechanism for transmitting power to the driven shaft, at a speed or direction differing from the driving shaft is as follows: The driving shaft 1, preferably running at constant speed rotates the fly wheel 2, carrying the planetary gears 5, 6, 7 and 8. By operating the lever 21, the collar 20 is oscillated, and the cams 19 cause the friction disk 17 to engage the friction disk 15 and gradually lock the gear wheel 12 to the casing 16. The gear 8, rotating in mesh with the gear 12, causes the shafts 3 to rotate and transmit motion through gears 5, 6 and 7 at different speeds to the gears 9, 10 and 11, loose upon the shaft 13. By means of the lever 38, the rods 28 are operated to slide the clutch keys 29 along the shaft 13 until they engage a slot in one or the other of the gears 9, 10 and 11, and lock the shaft 13 thereto. Power will now be transmitted from the driving shaft 1 through the transmission gearing to the driven shaft 13, at a speed depending upon the gear engaged by the clutch keys 29. A change of speed can be effected at any time by shifting the clutch keys 29 along the shaft from one gear to another, and this can be done without disconnecting the friction clutch. If it is desired at any time to disconnect the driven shaft 13, it is only necessary to shift the clutch keys into one of the annular channels between the several gears. Should it be desired to throw the load on shaft 13 more gradually upon the driving shaft, the clutch keys can first be engaged with the selected gear wheel and then friction be gradually thrown upon the friction disk 15, thus gradually locking the gear 12 to the casing 16.

In Fig. 1, the keys 29 are shown in engagement with gear wheel 11, causing the driven shaft to move as gear 11 is moved. The speed of gear wheel 11 is proportioned to the difference in the sizes of the gear wheels 7, 11, and the gear wheels 8, 12. As the fly wheel 2 rotates, shafts 3, together with the gear wheels 7 and 8, are carried bodily in a circular path around, that is, revolved about, the driven shaft 13. The speed of rotation of gear wheels 8 being proportioned to the travel of shafts 3 around stationary gear wheel 12, then the speed of rotation of gear wheel 7 being the same but having a larger diameter, will cause the gear wheel 11 to turn in a reverse direction as the gear wheels 7 are moved bodily in the circular path to which reference has been made.

It will be understood that the gear wheels 5 and 6 being smaller than gear wheel 8, the gear wheels 9 and 10 will be rotated by the corresponding gear wheels 5 and 6 in the same direction as the rotation of the fly wheel, but at a reduced speed.

The mechanism so far described is similar to that shown and described in my earlier application referred to.

Referring to Fig. 1, if key 29 be moved to the left out of engagement with gear wheel 11, and into the annular channel between gear 11 and gear 10, no rotation will be imparted to shaft 13. Movement of key 29 into engagement with gear wheel 10 will cause a slow rotation of shaft 13 in the same direction as the fly wheel. Movement of key 29 into the channel between gears 10 and 9 will cause no rotation of shaft 13, and movement of key 29 into engagement with gear wheel 9, will cause shaft 13 to rotate at a greater speed than gear wheel 10. Further movement of key 29 to the left will cause gear wheel 9 to be thrown out of clutch with shaft 13, and key 29 will occupy the position shown in Fig. 5. Clutching of the driven shaft 13 to the fly wheel 2 causes the driven shaft to rotate at the same speed and in the same direction as the driving shaft 1. In order that no shock will be caused when the driven shaft is clutched to the driving shaft, I have provided a friction clutch operated by means of the keys 29, which in the various modifications herein shown and described, constitute the present improvements. In Figs. 1, 2, 3, 4 and 5, is shown a device for clutching a disk 39, attached to the driven shaft, by friction between a plate 40 attached to the fly wheel and the gear wheel 9 this disk 39, being thereby frictionally held between the plate 40 and the gear wheels on the driven shaft and in mesh with those fixed to counter shafts 3 in the fly wheel. This friction is thrown in or out of action by means of keys 29, which take against dogs 41, pivoted at 42 to the disk 39. Movement of keys 29 from the position shown in Fig. 5 to the position shown in Fig. 4, against one end of pivoted dogs 41, causes a cam surface 43 on the opposite end acting upon a projection 44 forming part of a ring 45 loosely mounted on gear wheel 9, to force said ring into frictional engagement with friction material 46, attached to one side of the gear wheel 9. Projections 44 ride in slots 47 in which the dogs have movement. The opposite side of gear wheel 9 is provided with a surface 48, adapted for frictional engagement with frictional material 49, which is also adapted for frictional engagement with a surface 50, attached to gear wheel 10. Gear wheel 10 has a short longitudinal movement on shaft 13, and abuts against gear wheel 11, gear 11 abuts against gear 12, and gear 12 abuts against the bearing 51 of fly wheel 2 upon the hub extension 14 of gear wheel 12, so that the resistance offered by bearing 51, causes disk 39 to be forced against the plate 40, until the friction between the various parts becomes great enough to cause the fly wheel, the gears, and the driven shaft to turn as a unit. To take up the wear caused by friction against friction surfaces 46 and 49, the plate 40 can be adjusted by means of rods 52, which are forced against the plate by an adjustable ring 53, fitting a screw threaded hub 54 of the fly wheel. As gear wheel 9 and gear wheels 5, 6, 7 and 8, become an immovable part of the fly wheel, gear wheels 5, 6, 7, 8, not rotating, when this friction is applied, it is necessary before actuating the dogs 41 to throw the friction disk 17 out of engagement with the friction disk 15, in order that gear wheel 12 will offer no resistance to the non-rotating travel or revolution of gear wheel 8. A further increase of friction surface could be accomplished by modifying the gear wheels so that friction surfaces similar to 48, 49 and 50, could be placed between gear wheels 10 and 11 and between gear wheels 11 and 12. Such a modification would come within the scope of this invention.

In Fig. 7 is shown a modification in which the keys 29 actuate dogs controlling a friction clutch, indirectly clutching the driven shaft to the fly wheel at the end of movement of the keys in each direction. In this case, movement of keys 29 to the left against dogs 41 causes disk 39, attached to shaft 13 to be clutched between plate 40 and gear wheel 9, which in turn is clutched against gear wheel 10. Movement of keys 29 to the right will throw shaft 13 into and out of clutch in succession, with gear wheels 9, 10 and 11. When keys 29 are thrown out of engagement with gear wheel 11, they enter slots 55 in a disk 56, loosely mounted on shaft 13, the disk being held from turning thereon by means of a pin 57, extending through a slot 58 in the shaft. Disk 56 is adapted for frictional engagement between the two gear wheels 11 and 12, either of which would tend to rotate relatively to the other in case a load were applied to the other, due to the gear wheels secured to shafts 3, carried by said fly wheel and intermeshing with said gears. The clutching to the fly wheel in this case is accomplished by clutching the shaft 13 to two gears on said shaft which are rotated by said fly wheel through the medium of gears on shafts 3, at the same time checking the movement of said movable parts and causing them to become immovably locked to fly wheel. This friction is thrown in or out of action by movement of keys 29, which take against dogs 59, moving in slots 55 and pivoted at 60 to disk 56. Movement of keys 29 to the right from the position shown in Fig. 7 against one end of pivoted dogs 59, causes a cam surface 61 on the opposite end to act upon a projection 62, forming part of a ring 63, loosely mounted on gear wheel 11, and adapted to make frictional engagement with friction material 64, attached to one side of gear wheel 11. Projection 62 rides in slots 55, in which the dogs 59 have movement. The resistance offered by plate 40 against disk 39, and gear wheels 9, 10 and 11, causes disk 56 to be forced against the gear wheel 12 until the friction becomes great enough to prevent rotation of gears 11 and 12 relatively to each other, and thereby cause the fly wheel, the gears, and the driven shaft to turn as a unit.

In Fig. 8 is shown a modification, in which the keys 29 actuate dogs controlling a friction clutch, directly clutching the driven shaft to the fly wheel, at the end of movement of the keys in one direction, said keys at the end of their movement in the opposite direction serving to actuate dogs controlling a friction clutch to gear wheel 9, causing rapid rotation of shaft 13. In this case, movement of keys 29 to the right against dogs 59, causes disk 56 connected to shaft 13, to be thrown into frictional engagement between the two gear wheels 11 and 12, thereby preventing their rotation at different speeds, causing them to become an immovable part of the fly wheel, and at the same time clutching the driven shaft thereto. Movement of keys 29 to the left will throw the driven shaft out of clutch with the gear wheels 11 and 12. Further movement of keys 29 to the left will throw shaft 13 into and out of clutch in succession, with gear wheels 11 and 10. When keys 29 are thrown out of engagement with gear wheel 10, they enter slots formed in an enlarged part 65 of shaft 13, on which gear wheel 9 rotates, the gear wheel 9 in this case having no slots for the keys to engage with. Further movement of keys 29 to the left, actuates dogs 66, pivoted at 67 to a disk 68, fixed to shaft 13. Dogs 66 are each provided with a wedge 69, which is moved outward between the free ends of a pair of pivoted shoes 70, such as shown in Fig. 10. This causes friction to be applied against the inner face of a cylindrical flange 71, attached to gear wheel 9. It will be understood that this modification provides for clutching shaft 13 gradually to the rapidly rotating gear wheel 9, without releasing friction disk 15 from engagement with casing 16.

In Fig. 9 is shown a modification in which the keys 29, used to clutch the driven shaft 13 to speed changing gear wheels 9, 10 and 11, are also used to actuate the dogs 66, having wedges 69, which cause frictional engagement of pivoted shoes 70 against the inner face of a cylindrical flange 72, forming part of fly wheel 2. Movement of keys 29 against dogs 66, causes outward movement of wedges 69 between the free ends of shoes 70, which are pivoted at 73 to the disk 68, attached to the shaft 13. Shoes 70 are provided with friction surfaces 74, which are thrown into engagement with flange 72, when shoes 70 are forced outward by means of wedges 69. The shoes 70 are normally held out of engagement with flange 72 by means of springs 75.

If, as shown in Fig. 9, keys 29 are in engagement with gear wheel 9, and friction disk 17 thrown out of engagement with disk 15, the resistance offered by shaft 13 to the rotation of gear wheel 9 will cause gear wheels 5 and shafts 3 and the remaining gear wheels to rotate during the rotation of the fly wheel, and as no resistance is offered by the friction disk 17 to the rotation of gear wheel 12, no movement will be imparted to shaft 13. It will, therefore, be evident that when friction disk 17 is thrown off, no power will be applied through the gearing to drive the shaft 13. If, however, keys 29, acting against dogs 66 to throw the shoes 70 into engagement with flange 72, forming part of the fly wheel, and the friction disk 17 thrown off, all the gear wheels will be carried bodily around along with the driven shaft 13 during the rotation of the fly wheel. Or, if the friction disk 17 be thrown on, the gear wheels 9, 10 and 11 will be idly rotated by means of the gear wheels on shaft 3 during the rotation of the fly wheel. It will, therefore, be evident that in the modification shown in Figs. 9, 10 and 11, it will not be necessary to throw the friction disk 17 off before clutching shaft 13 direct to the fly wheel.

I have described for purposes of illustration various modifications of my invention, but it is to be understood that all modifications are within the scope of the following claims.

Having thus described my invention, I claim:

1. In gear transmission mechanism, a driving shaft; a driven shaft, a fly wheel carried by said driving shaft; planetary gears carried by said fly wheel; means whereby rotation of said fly wheel causes said planetary gears to rotate on their axes; gears on said driven shaft for coöperating with said planetary gears; key means for clutching said driven shaft selectively to one of the said gears on said driven shaft; and a friction clutch within said fly wheel and operable by said key means for rendering said driving and driven shafts relatively fixed.

2. In gear transmission mechanism, a driving shaft, a driven shaft, a fly wheel carried by said driving shaft, a series of planetary gears of selected sizes carried by said fly wheel, means whereby rotation of said fly wheel causes said planetary gears to rotate on their axes, a complementary series of gears carried by said driven shaft and coöperating with said series of planetary gears in selective trains, selective means for operatively connecting said driven shaft to any one of said complementary series of gears, and a plurality of frictional clutching mechanisms within said fly wheel for rendering said driving and driven shafts relatively fixed, any one of said frictional clutching mechanisms being operable by said selective means.

3. In gear transmission mechanism, a driving shaft; a driven shaft; a fly wheel carried by said driving shaft; planetary gears of varying sizes, countershafts carrying said gears and journaled in said fly wheel; two or more coöperating gears rotatably secured upon said driven shaft, means for holding one of said gears against rotation; key means for clutching another of said gears to said driven shaft to impart a selected speed thereto relative to that of the driving shaft; and friction means operable by said key means frictionally to clutch two or more of said gears on the driven shaft against relative rotation and to said driven shaft so as to rotate said driven shaft at the same speed as the driving shaft.

4. In gear transmission mechanism, a driving shaft running at uniform speed; a driven shaft; a fly wheel secured to the driving shaft; a series of gears of varying size bodily carried by and journaled upon said fly wheel; another series of complementary gears carried by said driven shaft and respectively in mesh with the gears of said first series; means for causing rotation of said first series of gears; said fly wheel and said gears carried by said driven shaft constituting driving elements for said driven shaft; means for coupling said driven shaft to any one of said driving elements; and friction means within said fly wheel for one or more of said driving elements and coöperating with said means for coupling to clutch said driven shaft to said element.

5. A power transmitter comprising a driving shaft running at a uniform speed, a fly wheel secured to said shaft, and a driven shaft, a series of planetary gear wheels of varying diameter fixed together and journaled on said fly wheel, a stationary gear wheel meshing with one of said gear wheels whereby rotation of said fly wheel causes said planetary gear wheels to rotate on their axes, gear wheels on the driven shaft meshing with several of said planetary gear wheels, a device for clutching the driven shaft to any one of said gear wheels thereon, and a friction clutching mechanism operable by said clutch device for rendering said driving and driven shafts relatively fixed.

6. A power transmitter comprising a driving shaft running at a uniform speed, and a driven shaft, a fly wheel secured to the driving shaft, gear wheels on said fly wheel and adapted for transmission of power to said driven shaft, means for causing rotation of said gear wheels, complementary gear wheels loosely mounted on said driven shaft, a device for clutching said complementary gear wheels to the driven shaft, means whereby the mechanism causing rotation of said gear wheels is made inoperative, a friction mechanism operable by said clutch device for rigidly maintaining the driving and driven shafts and both sets of gear wheels relatively fixed.

7. A power transmitter comprising a driving shaft running at a uniform speed, and a driven shaft, a fly wheel secured to the driving shaft, gear wheels on said fly wheel and adapted for transmission of power to said driven shaft, means for causing rotation of said gear wheels, complementary gear wheels on said driven shaft, a device for clutching said complemental gear wheels to the driven shaft, means whereby the mechanism causing rotation of said gear wheels is made inoperative, and a friction mechanism operable by said clutch for clutching a part fixed to the driven shaft between the fly wheel and said gear wheels, whereby said driving and driven shafts are maintained relatively fixed.

8. A power transmitter comprising a driving shaft running at a uniform speed, and a driven shaft, a fly wheel secured to the driving shaft, a series of planetary gear wheels of varying diameter mounted on said fly wheel, a stationary gear wheel meshing with one of said gear wheels for causing rotation of the first mentioned gear wheels, gear wheels on the driven shaft in mesh with said first mentioned gear wheels and driven thereby, a device for clutching the last mentioned gear wheels to the driven shaft, means whereby said stationary gear wheel is rendered freely rotatable, and a friction mechanism operable upon the shifting of said clutch device from engagement with said gear wheels for clutching a fixed part of the driven shaft between the fly wheel and the last mentioned gear wheels, the friction of abutting sides of said gear wheels serving to check their rotation at different speeds whereby said driving and driven shafts are maintained relatively fixed.

9. A power transmitter comprising a driving shaft running at a uniform speed, and a driven shaft, a fly wheel secured to the driving shaft, power transmission gear wheels on said fly wheel, and means for causing their rotation on their axes, complementary power transmission gear wheels on the driven shaft, frictional clutching mechanism for rendering said driving and driven shafts relatively fixed, devices for actuating said frictional clutching mechanism, means whereby said devices can be shifted to release the driven shaft from the driving shaft, means whereby further movement of said devices will cause the driven shaft to be clutched to any one of several of the complemental power transmission gear wheels, means for controlling the operation of the first mentioned power transmission gear wheels, and means for rendering said last mentioned controlling means effective.

10. A power transmitter comprising a driving shaft running at a uniform speed, and a driven shaft, a fly wheel secured to the driving shaft, planetary gear wheels on said fly wheel, complementary power transmission gear wheels on the driven shaft, an adjustable plate, said driven shaft having a fixed part carrying a frictional clutching mechanism, a device on the driven shaft which can be moved to actuate said frictional clutching mechanism causing frictional engagement of said fixed part, said adjustable plate, and the last mentioned gear wheels.

11. A power transmitter, comprising a driving shaft running at a uniform speed, and a driven shaft, a fly wheel secured to the driving shaft, a planet shaft journaled on said fly wheel, a series of planetary gear wheels of varying diameter secured to said planet shaft, a stationary gear wheel meshing with one of said planetary gear wheels for causing their rotation, transmission gear wheels on the driven shaft, and meshing with said planetary gears, a device for clutching the last mentioned gear wheels to the driven shaft, means whereby said stationary gear wheel is rendered freely rotatable, a friction mechanism operable by said clutch device when shifted from engagement with said transmission gear wheels for clutching a part of the driven shaft between the fly wheel and one of said transmission gear wheels, thereby rendering said driving and driven shafts relatively fixed.

12. A power transmitter comprising a driving shaft running at a uniform speed, and a driven shaft, a fly wheel secured to the driving shaft, a series of planetary gear wheels of varying diameter on said fly wheel, a second series of gear wheels on the driven shaft and rotated at different speeds by said planetary gear wheels, means for causing rotation of the first mentioned gear wheels, a device for clutching the second series of gear wheels to the driven shaft, means whereby the mechanism causing rotation of the first series of gear wheels is rendered inoperative, a friction mechanism operable upon shifting of said clutch device for clutching a part of the driven shaft to a plurality of gear wheels, thereby checking their rotation at different speeds and rendering said driving and driven shafts relatively fixed.

13. A power transmitter comprising a driving shaft running at a uniform speed and a driven shaft, a fly wheel secured to the driving shaft, a series of planetary gear wheels of varying diameter on said fly wheel, a second series of gear wheels on the driven shaft and rotated at different speeds by said planetary gear wheels, means for causing rotation of the first mentioned gear wheels, a device on the driven shaft for clutching the driven shaft to any one of several of the second series of gear wheels, a friction clutching mechanism for clutching a part of the driven shaft between two of the second series of gear wheels, means whereby the mechanism causing rotation of the first series of gear wheels is rendered inoperative, and means whereby said clutch device on the driven shaft can be shifted to actuate said friction clutching mechanism, thereby checking rotation of said two gear wheels at different speeds and rendering said driving and driven shafts relatively fixed.

14. A power transmitter comprising a driving shaft running at a uniform speed, and a driven shaft, power transmission members interposed between the driving shaft and the driven shaft, a device for clutching any one of several of said power transmission members to the driven shaft, means whereby several of said interposed power transmission members can be thrown into frictional engagement with each other, a friction surface member adapted to be rotated with the driven shaft, and means whereby said friction surface member on the driven shaft may be moved into frictional engagement with one of said interposed power transmission members.

15. In gear transmission mechanism, a driving shaft; a fly wheel secured thereto; speed gears carried within said fly wheel; a driven shaft; complemental gears on said driven shaft, and a clutch located in said fly wheel adapted to clutch said driven shaft between said driving shaft and said complemental gears.

16. In gear transmission mechanism, a driving shaft, a fly wheel secured to said driving shaft, speed gears carried by said fly wheel, a driven shaft, complemental gears meshing with said speed gears, a clutch adapted to connect one of said complemental gears to the driven shaft, a device adapted for rendering another of said complemental gears stationary or movable, and means for clutching said driven shaft between said driving shaft and said complemental gears.

17. In gear transmission mechanism, a driving shaft; a fly-wheel connected to said driving shaft; speed gears carried by said fly-wheel; a driven shaft; complemental gears on said driven shaft and a clutching device at each of the two ends of and within said fly wheel and interposed between said driving and said driven shaft.

18. In gear transmission mechanism, a driving shaft, a fly wheel connected to said driving shaft, speed gears carried by said fly wheel; a driven shaft, complemental gears meshing with said speed gears, a device adapted for rendering one of said complemental gears stationary or movable, a selective key adapted to clutch any one of the remaining complemental gears to the driven shaft and a clutching device at each of the two ends of and within said fly wheel and interposed between said driving and said driven shaft, the last mentioned clutching devices being operable by said selective key.

19. In transmission gearing, a driving shaft, a fly wheel secured to said driving shaft, a driven shaft, gear elements journaled on said fly wheel and on said driven shaft, means whereby rotation of said fly wheel causes rotation of said gear elements on the driven shaft at relatively different degrees of speed, means for clutching the driven shaft to any one of several of said gear elements thereon, and means for clutching the driven shaft between said fly wheel and said gear elements whereby direct transmission may be obtained.

20. In transmission gearing, a driving shaft, a fly wheel secured to said driving shaft, a driven shaft, gear elements journaled on said fly wheel and on said driven shaft, means whereby rotation of said fly wheel causes rotation of said gear elements on the driven shaft at relatively different degrees of speed, means for clutching the driven shaft to any one of a plurality of said gear elements thereon, means for clutching the driven shaft between said fly wheel and said plurality of gear elements, and means for causing frictional engagement of said plurality of gear elements with each other, whereby their rotation at different degrees of speed is arrested.

21. In transmission gearing, a driving shaft, a fly wheel secured to said driving shaft, a driven shaft, gear elements journaled on said fly wheel and on said driven shaft, means whereby rotation of said fly wheel causes rotation of said gear elements at relatively different degrees of speed, a key adapted for clutching any one of more than two of said gear elements to the driven shaft, and means for clutching the driven shaft between said fly wheel and said gear elements.

22. Transmission gearing, comprising a driving shaft, a fly wheel secured to said driving shaft, a driven shaft, gear elements journaled on said fly wheel and on said driven shaft, means whereby rotation of said fly wheel causes rotation of said gear elements on the driven shaft at relatively different degrees of speed, means for clutching the driven shaft to any one of several of said gear elements thereon, means for causing frictional engagement of said gear elements on the driven shaft with each other, whereby their rotation at different degrees of speed is arrested, said means also serving to clutch the driven shaft between said fly wheel and said arrested gear elements.

23. Transmission gearing comprising a driving shaft, a driven shaft, idle gear elements interposed therebetween, frictional means for locking a plurality of said gear elements together, selective means for locking any of said gear elements in operative position, and means governed by said selective means for rendering said locked gear elements immovable with relation to the driving shaft.

24. A power transmitter comprising a driving shaft running at a uniform speed, and a driven shaft, a fly wheel secured to the driving shaft, planetary gear wheels on said fly wheel, complementary power transmission gear wheels on the driven shaft, a fixed part of the driven shaft and said complementary gear wheels abutting against each other and having longitudinal movement between two fixed parts of the fly wheel, a frictional clutching mechanism carried by said fixed part of the driven shaft, and a device on the driven shaft which can be moved to actuate said friction mechanism, thereby causing frictional engagement of said fixed part of the driven shaft with one of said fixed parts of the fly wheels and with one of said complementary gear wheels and also causing frictional engagement of said complementary gear wheels with each other, and finally with the other fixed part of the fly wheel, whereby said driving and driven shafts are rendered relatively fixed.

25. A power transmitter comprising a driving shaft running at a uniform speed, and a driven shaft, a fly wheel secured to the driving shaft, power transmission gear wheels on said fly wheel, complementary power transmission gear wheels on the driven shaft, key means for clutching said driven shaft selectively to one of several of said gears on said driven shaft, and means for causing frictional engagement of the driven shaft and the gears thereon with said fly wheel, thereby rendering said driving and driven shafts relatively fixed.

In testimony whereof, I affix my signature, in the presence of two witnesses.

ARTHUR JACOB MORSE.

Witnesses:
LEONARD DAY,
E. M. WHEELER.